Oct. 9, 1962  W. A. WANNER ET AL  3,057,438
AERIAL CABLE BRAKE
Filed March 2, 1960  2 Sheets-Sheet 2
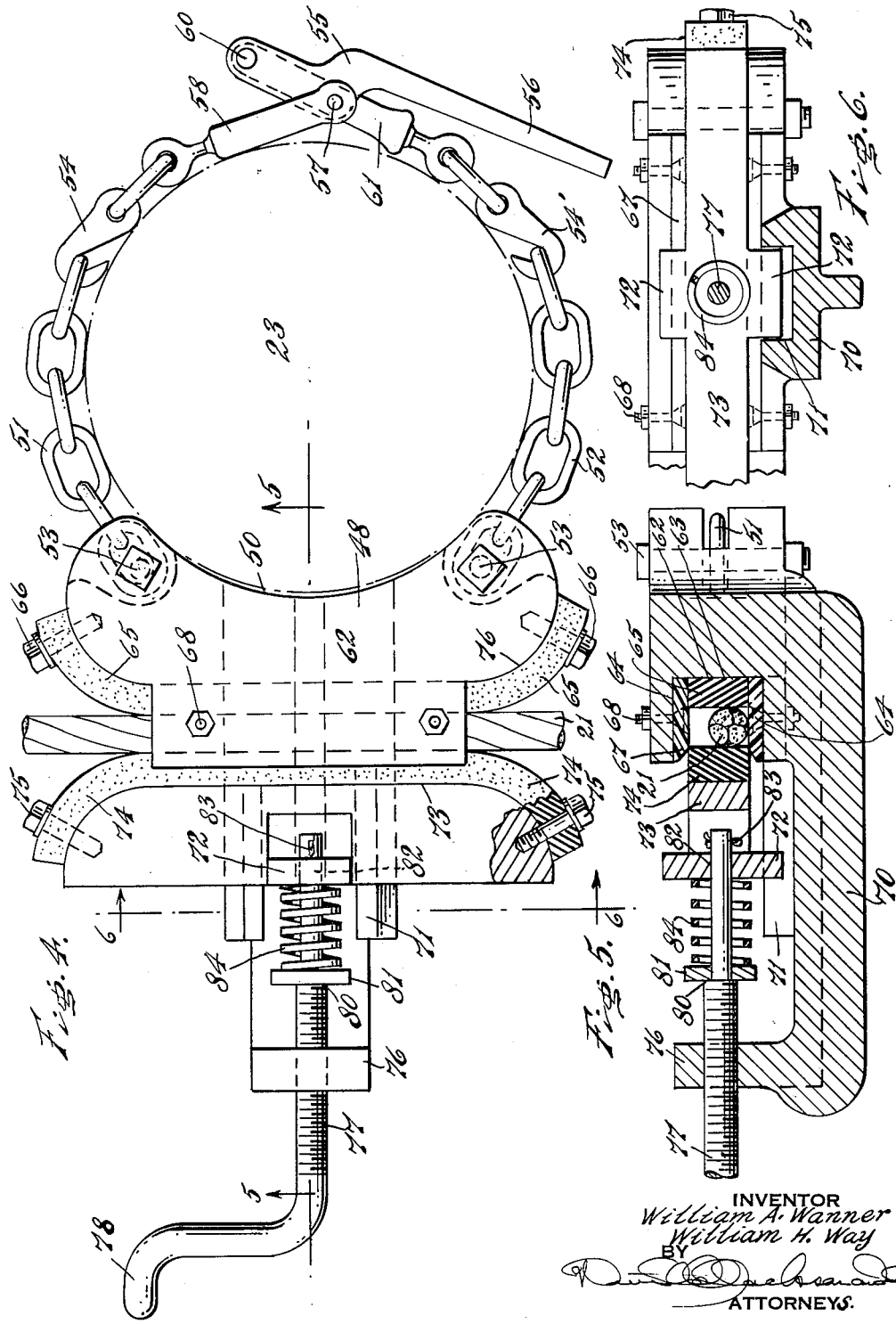
INVENTOR
William A. Wanner
William H. Way
BY
ATTORNEYS.

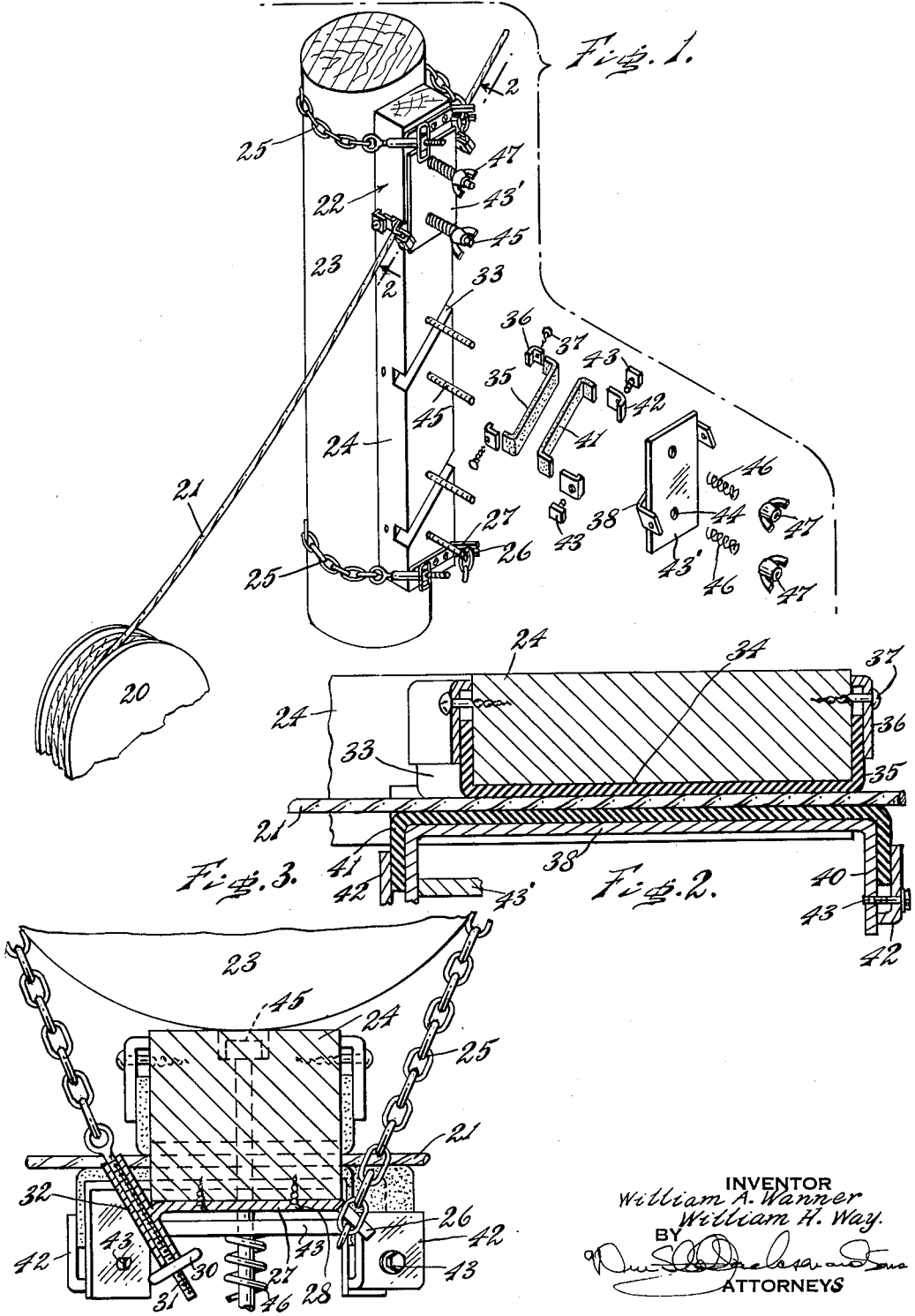

United States Patent Office 3,057,438
Patented Oct. 9, 1962

3,057,438
AERIAL CABLE BRAKE
William A. Wanner, 32 St. James Road, West Chester, Pa., and William H. Way, 1221 Stirling St., Coatesville, Pa.
Filed Mar. 2, 1960, Ser. No. 12,343
3 Claims. (Cl. 188—65.1)

The present invention relates to cable brakes for use particularly on aerial electric cable.

A purpose of the invention is to increase the safety to electric distribution personnel and to the general public in installing aerial cable.

A further purpose is to provide more effective braking in paying out aerial cable.

A further purpose is to make the braking means more reliable and protect against injury to personnel even in case a cable actively comes in contact with a live wire.

A further purpose is to provide a very simple, inexpensive, light and easily transported aerial cable brake.

In the drawings we have chosen to illustrate only two of the numerous embodiments in which the invention may appear, selecting the forms shown from the standpoints of convenience in illustration, satisfactory operation and clear demonstration of the principles involved.

FIGURE 1 is a fragmentary diagrammatic perspective of a device of the invention partially exploded to show the operating parts.

FIGURE 2 is a fragmentary enlarged section on the line 2—2 of FIGURE 1 in the direction of the cable channel.

FIGURE 3 is a fragmentary enlarged transverse section of the cable brake of the invention in the plane of the mounting device.

FIGURES 4 to 6, inclusive, illustrate a variation.

FIGURE 4 is a top plan view partially broken away illustrating the device of the invention.

FIGURE 5 is a fragmentary section on the line 5—5 of FIGURE 4.

FIGURE 6 is a fragmentary section on the line 6—6 of FIGURE 4.

Describing in illustration but not in limitation and referring to the drawings:

When installing high tension aerial cables through, over, or around, energized electric distribution lines, or over street crossings, it is very important that the new cable preserve proper clearances from existing electrical conductors and other objects. It will be evident at once that if precautions of this kind are not maintained and the new aerial cable becomes accidentally energized, serious accidents either to electric installation personnel, or to members of the general public, may be caused.

The practice in the past has been to brake or snub the cable reels as the cable is payed out. This is difficult and sometimes unreliable, however, because of the high inertia of a loaded cable reel. As a result tension has not always been accordingly maintained and accidents have resulted.

In accordance with the present invention, a cable brake is provided which can be conveniently mounted, as for example on an electric distribution pole, and which will operate independently of the cable reel. Thus, if the cable reel should overrun in paying out cable, the extra cable length will be prevented from running out of control.

In accordance with the invention, opposed jaws are provided which extend longitudinally and apply frictional drag to the cable, while at the same time insulating the cable from other parts of the brake.

The jaws can be separated to insert the cable and brought together to apply the desired drag on the cable.

The cable is laterally restrained to a channel between the jaws, so that it cannot jump out of the brake. The movable jaw is also guided in the preferred embodiment so that it will feed forward in the correct path.

Considering first the form of FIGURE 1, we there illustrate a cable reel 20 which is paying out electric cable 21 to a suitable aerial installation through a cable brake 22 of the invention.

The cable brake is mounted on a pole 23 and includes a brake base or support 24, suitably timber, which is interconnected to the pole by chains 25 at the top and bottom which are engaged at one end in anchorages 26 of brackets 27 secured to the timber as by screws 28 and are taken up at the other end by nuts 30 threaded on eye bolts 31 extending through guides 32 on the brackets 27.

At suitable intervals along the length of the timber, brake channels 33 are formed as by cutting diagonally upwardly extending grooves in the timber, the back portion or bottom of each groove forming a first brake jaw 34. The brake jaw is lined with a flat strip of frictional material, suitably frictional rubber, 35 which extends longitudinally at the bottom of the channel and is held at the ends by clips 36 engaging the ends of the rubber and secured by screws 37.

Cooperating with the first jaw 34, is a second jaw 38, which runs longitudinally of the channel 33 and is flanged at the ends at 40. A cooperating flat strip of frictional material, suitably friction rubber, 41 runs along the active surface of the second jaw 38 and is held at the ends by clips 42 secured by machine screws 43 which are threaded into the flanges 40 of the second jaw.

The second jaw 38 is secured as by welding to a guiding plate 43' which has guiding openings at the sides of the channel 33 at 44 through which extend guiding bolts 45 extending through the timber 24.

Surrounding the bolts 45 beyond the guiding plate 43' are helical compression springs 46 which act between the plate 43' at one end and wing nuts 47 on the bolts 45 at the other end.

The frictional rubber which engages the opposite sides of the cable 21 is electrically insulating, and all metal parts are remote from the cable so that if through inadvertence the cable should contact a live wire, the electrical current will not enter the metal parts of the cable brake itself and cannot be transmitted from one cable passing through the brake to another cable in the brake.

In operation, the cable can be threaded through the brake by relaxing the pressure of the movable jaw by means of the wing nuts 47 or actually removing the movable jaw 38, the guide plate 43', the wing nuts 47 and the springs 46, inserting the cable 21 laterally in the channel 33 and then restoring the movable jaw 38 and related parts.

The correct tension on the cable for braking purposes is established by tightening or loosening the wing nuts 47.

In FIGURES 1 to 3, three channels 33 and two brake structures are shown, and a separate cable can be payed out through each channel. Any number of channels and associated brake structure may be found in a brake base or support 24.

The form of FIGURES 4 to 6 provides a single brake for a single cable.

In this case a suitably metallic support 48 has a saddle 50 which is recessed to engage the curved side of the pole 23.

Chain portions 51 and 52 are pivotally connected by pins 53 to the support. The chains at the ends remote from the support are engaged by hooks 54 and 54' of a takeup device which involves a toggle lever 55 which has an operating handle 56, a pivotal connection at 57 to a yoke 58 connected by a chain link to hook 54, and a remote pivotal connection at 60 to a swivel arm 61 entering a recess in the toggle in tightened position and connected by a link to the other hook 54' as well known in the art.

The support 48 forms a first longitudinally extending jaw 62 which is of channel shape having a bottom 63 and sides 64.

The bottom receives a longitudinally extending frictional rubber flat strip 65 which is anchored at the ends of the jaw by bolts 66 which where necessary will be of insulating material such as plastic. As shown in FIGURE 5 the strip 65 is wider than the cable to be used. The sides of the channel are lined with liners of plastic 67, suitably polyester plastic having a fiberglass base. The liners are held in place by suitably recessed electrically insulating bolts 68 desirably of plastic.

From the support 48 in the direction transverse to its length, there is an extension 70 which has guideways 71 which receive a guiding abutment on a cooperating jaw 73 which has a surface extending longitudinally of the channel 62. The surface of the jaw 73 toward the rubber strip 65 is covered with a longitudinally frictional flat strip 74, suitably a frictional rubber, which is secured at the ends as by bolts 75 which where desired will be of electrically insulating material such as plastic.

The approach and trailing surfaces of both of the cooperating jaws are suitably curved as shown at 76 so as to avoid damage to the cable and permit easy feeding of the cable.

The covering 74 on the movable jaw 73 enters the channel between the channel liners 67 and engages the opposite side of the cable 21 from the frictional material 65 on the fixed jaw.

The extension 70 has a threaded lug 76 through which is threaded a takeup handle 77 provided with a handle grip 78. At the forward end of the takeup handle a shoulder 80 rests against a spring abutting washer 81 and beyond the shoulder the takeup handle is of reduced diameter and extends through an opening 82 in the movable jaw 73. At the forward end, the takeup handle has a cotter pin 83 which holds the parts together.

A helical compression spring 84 acts between the movable jaw and the spring abutting washer 81 to urge the movable jaw toward the fixed jaw.

In operation of the device of the invention, it is fastened to the pole by connecting the hooks 54 and 54' and then tightening the toggle device. The screw 77 is then backed off until the jaws are open and the cable can be inserted through the open side of the jaws. The screw 77 is then tightened until the desired braking pressure is applied by the frictional surfaces of the jaws, and then the cable is ready to be payed out. The frictional material on the jaws is also electrically insulating, so that in case of unintended contact with a live wire, the metallic parts of the brake will not be energized.

Although the cable brake of FIGURE 5 is illustrated as being mounted on the pole 23 with its longitudinal cable channel substantially horizontal or at right angles to the pole, it may readily be securely mounted at angles substantially inclined to the horizontal. The recess of the saddle 50 is of greater curvature than that of conventional poles, permitting the outward ends to press into the pole and hold securely at various angles. The device may also be mounted securely on cross arms or similar structures.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a cable brake, a support, a first jaw on said support comprising a longitudinally extending channel having bottom and side walls, substantially flat-surfaced friction means on the bottom of the longitudinally extending channel adapted to engage one side of a cable which is substantially narrower than the spacing of said side walls, a second jaw opposed to the first jaw having a longitudinally extending substantially flat surface and adapted to cooperate with the first jaw, retaining means cooperating with the two jaws, substantially flat-surfaced friction means on the longitudinally extending surface of the second jaw adapted to extend into the longitudinally extending channel and adapted to engage the opposite side of said cable, adjustable spring means associated with said support having capacity for urging the second jaw toward the first jaw and means associated with said retaining means for moving the second jaw away from and toward the first jaw permitting separation of the jaws to insert the cable and closing of the jaws to apply braking to the cable, said frictional means being so related to the cable engaged therebetween as to permit restrained longitudinal movement of said cable upon application of a predetermined pressure on said jaws, and said spring means having capacity within its range of adjustment to exert said predetermined pressure.

2. A brake of claim 1, in which said side walls and said friction means are composed of electrically insulating material.

3. A brake of claim 1, in which said friction means comprise strips of frictional rubber secured to said jaws.

References Cited in the file of this patent

UNITED STATES PATENTS

| 286,024 | Lange | Oct. 2, 1883 |
| 669,551 | Rutherford | Mar. 12, 1901 |
| 976,861 | Firestone | Nov. 29, 1910 |
| 1,020,065 | Welsh | Mar. 12, 1912 |
| 1,454,238 | Kaufman | May 8, 1923 |
| 2,833,423 | Tucker | May 6, 1958 |
| 2,938,678 | Hrovat | May 31, 1960 |

FOREIGN PATENTS

| 835,175 | France | Sept. 19, 1938 |
| 714,317 | Great Britain | Aug. 25, 1954 |